(12) United States Patent
Nichols et al.

(10) Patent No.: US 11,006,574 B1
(45) Date of Patent: May 18, 2021

(54) MOWER WITH ROTARY CUT HEIGHT ADJUSTMENT

(71) Applicant: Alamo Group Inc., Seguin, TX (US)

(72) Inventors: Jonathan Nichols, Maplesville, AL (US); Darrel Siebert, Valley Grande, AL (US); Fred Daniel Oglesby, Selma, AL (US); Dawson W. Hastings, Selma, AL (US)

(73) Assignee: Alamo Group Inc., Seguin, TX (US)

( * ) Notice: Subject to any disclaimer, the term of this patent is extended or adjusted under 35 U.S.C. 154(b) by 484 days.

(21) Appl. No.: 15/896,825

(22) Filed: Feb. 14, 2018

Related U.S. Application Data

(60) Provisional application No. 62/458,939, filed on Feb. 14, 2017.

(51) Int. Cl.
 *A01D 34/74* (2006.01)
 *A01D 34/64* (2006.01)

(52) U.S. Cl.
 CPC .............. *A01D 34/74* (2013.01); *A01D 34/64* (2013.01)

(58) Field of Classification Search
 CPC ........ A01D 34/74; A01D 34/64; A01D 34/81; A01D 34/43
 See application file for complete search history.

(56) References Cited

U.S. PATENT DOCUMENTS

| | | | |
|---|---|---|---|
| 2,407,696 A * | 9/1946 | Webster | 74/527 |
| 3,680,293 A * | 8/1972 | Klemenhagen | A01D 34/53 56/249 |
| 4,120,136 A * | 10/1978 | Rose | A01B 59/044 56/15.8 |
| 4,835,952 A * | 6/1989 | McLane | A01D 34/74 280/43.13 |
| 5,142,850 A | 9/1992 | Patterson et al. | |
| 5,238,267 A | 8/1993 | Hutchison et al. | |
| 5,784,870 A * | 7/1998 | Seegert | F16H 15/02 56/320.1 |
| 5,797,252 A * | 8/1998 | Goman | A01D 34/74 56/17.2 |
| 6,122,903 A * | 9/2000 | Hayashi | A01D 34/74 56/15.7 |
| 6,427,430 B1 | 8/2002 | Swartzendruber | |
| 6,588,188 B2 | 7/2003 | Dennis | |
| 6,658,831 B2 * | 12/2003 | Velke | A01D 34/64 56/14.7 |

(Continued)

*Primary Examiner* — Thomas B Will
*Assistant Examiner* — Joan D Misa
(74) *Attorney, Agent, or Firm* — Pizarro Allen PC

(57) ABSTRACT

A mower may include a frame, a cutting deck suspended from the frame, and a cut height adjustment system configured for raising and lowering the cutting deck to a plurality of cut height positions. The cut height adjustment system may include a rotatable, stepped cylinder having a plurality of steps wherein each of the plurality of steps corresponds to one of the plurality of cut height positions, and a pawl may be configured for engagement with the plurality of steps in order to set the cutting deck at a desired cut height position. The stepped cylinder may be mounted to a rotatable base plate, and a knob may be attached to an upper end of a shaft connected to the base plate. Each of the plurality of cut height positions may be manually selectable by rotation of the knob.

11 Claims, 14 Drawing Sheets

(56) References Cited

U.S. PATENT DOCUMENTS

| | | | | |
|---|---|---|---|---|
| 6,837,032 B1* | 1/2005 | Swartzendruber | A01D 34/64 | 56/14.9 |
| 6,854,252 B2 | 2/2005 | Foster | | |
| 7,013,626 B1* | 3/2006 | Strope | A01D 34/68 | 56/15.8 |
| 7,051,499 B2* | 5/2006 | Goto | A01D 34/74 | 56/14.9 |
| 7,059,109 B2* | 6/2006 | Samejima | A01D 34/64 | 56/17.1 |
| 7,197,863 B1* | 4/2007 | Sugden | A01D 34/66 | 56/15.8 |
| 7,441,392 B2* | 10/2008 | Lilliestielke | A01D 34/74 | 56/15.2 |
| 7,448,191 B2 | 11/2008 | Elhardt et al. | | |
| 7,540,134 B1* | 6/2009 | Reich | A01D 34/74 | 56/17.1 |
| 7,540,135 B2 | 6/2009 | Strope | | |
| 7,562,515 B2 | 7/2009 | Komorida et al. | | |
| 7,578,117 B2* | 8/2009 | Shaffer | A01D 34/74 | 56/17.1 |
| 7,614,207 B2 | 11/2009 | Elhardt et al. | | |
| 7,669,395 B2* | 3/2010 | Wehler | A01D 34/74 | 56/15.9 |
| 7,690,178 B2 | 4/2010 | Hagen et al. | | |
| 7,708,292 B2 | 5/2010 | Foster | | |
| 7,730,705 B2* | 6/2010 | Kubinski | A01D 34/74 | 56/17.1 |
| 7,770,370 B2* | 8/2010 | Komorida | A01D 34/661 | 56/17.1 |
| 7,775,025 B1* | 8/2010 | Coffin | A01D 34/54 | 56/249 |
| 8,087,226 B2* | 1/2012 | Hallale | A01D 34/62 | 56/249 |
| 8,320,096 B2 | 11/2012 | Harnett | | |
| 8,371,095 B2* | 2/2013 | Grewe | A01D 34/67 | 56/17.2 |
| 8,387,350 B2* | 3/2013 | Slater | A01B 45/02 | 56/17.2 |
| 8,756,903 B2* | 6/2014 | Walden | A01D 34/662 | 56/15.8 |
| 8,763,355 B2* | 7/2014 | Sugio | A01D 34/81 | 56/255 |
| 8,919,087 B2* | 12/2014 | Lancaster | A01D 34/74 | 56/17.1 |
| 9,021,776 B2 | 5/2015 | Zwieg et al. | | |
| 9,288,940 B2* | 3/2016 | Berglund | A01D 34/64 | |
| 9,445,543 B2* | 9/2016 | Berglund | A01D 34/64 | |
| 9,622,406 B2* | 4/2017 | Tada | A01D 67/005 | |
| 10,645,873 B2* | 5/2020 | Reichard | A01D 34/64 | |
| 10,694,665 B2* | 6/2020 | Lapp | A01D 34/74 | |
| 2002/0035825 A1 | 3/2002 | Swartzendruber | | |
| 2006/0090442 A1* | 5/2006 | Komiya | A01D 34/74 | 56/14.7 |
| 2007/0012016 A1 | 1/2007 | Strope | | |
| 2007/0169456 A1* | 7/2007 | Komorida | A01D 34/74 | 56/17.1 |
| 2008/0190087 A1 | 8/2008 | Elhardt et al. | | |
| 2013/0074467 A1 | 3/2013 | Zwieg et al. | | |
| 2016/0037717 A1 | 2/2016 | Giere | | |
| 2016/0106030 A1 | 4/2016 | Lundgren et al. | | |
| 2019/0387676 A1* | 12/2019 | Welz | A01D 34/661 | |

* cited by examiner

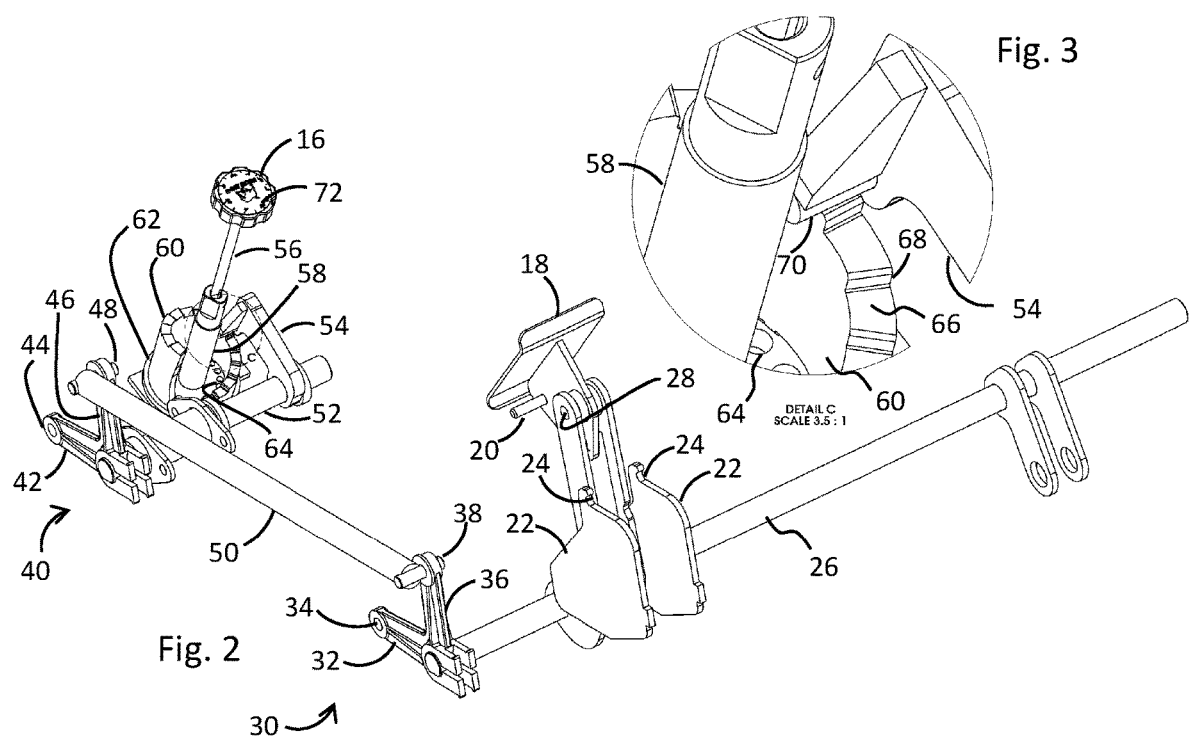

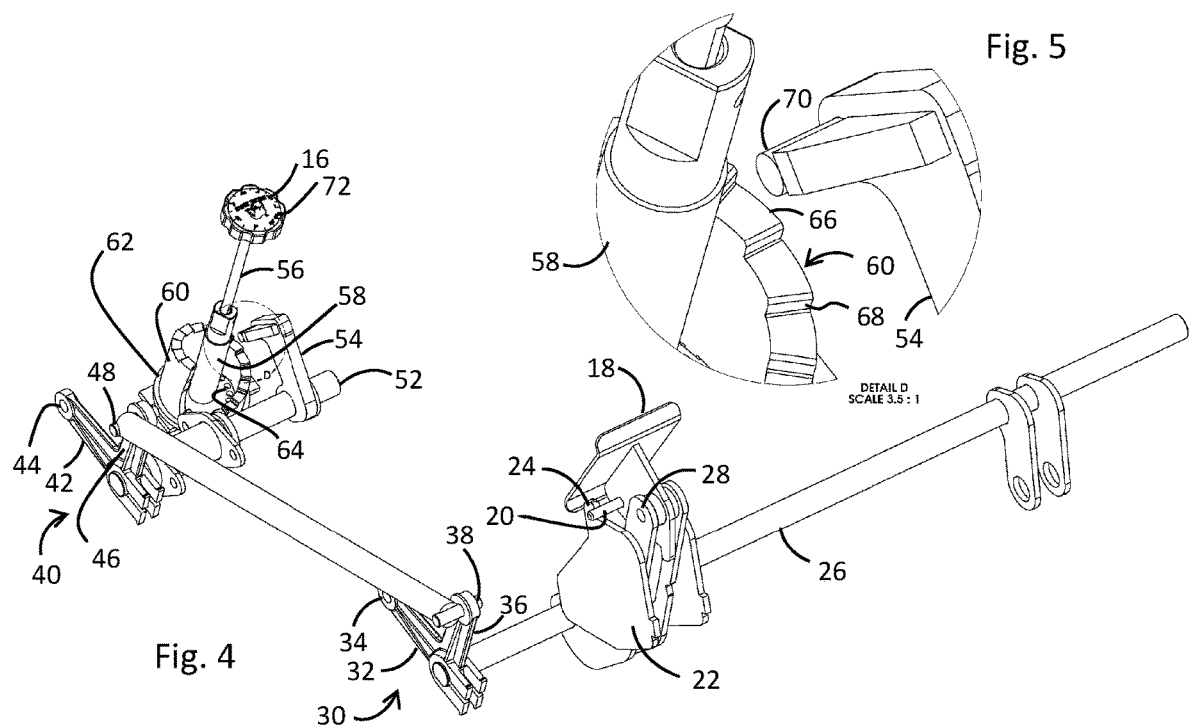

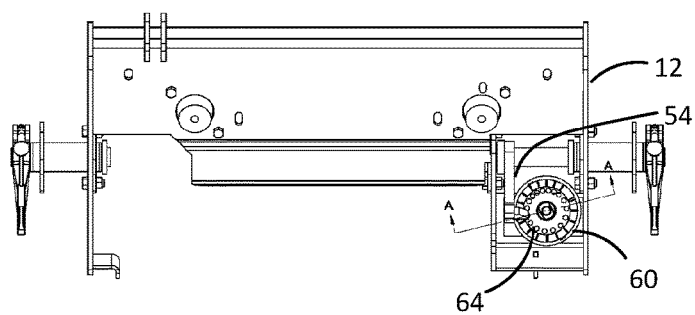
Fig. 6
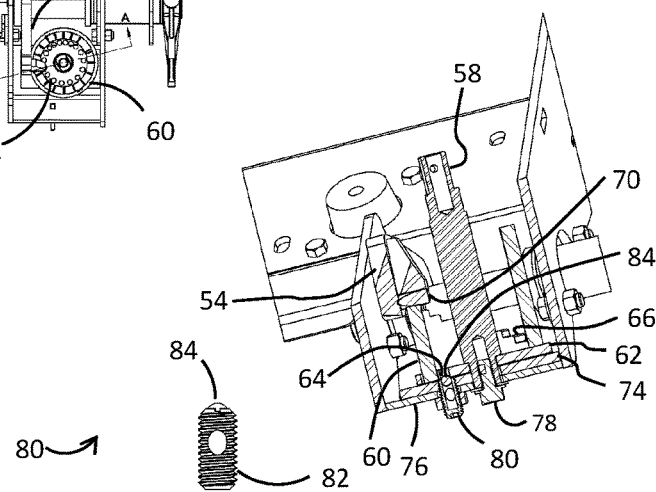
Fig. 8
Fig. 7

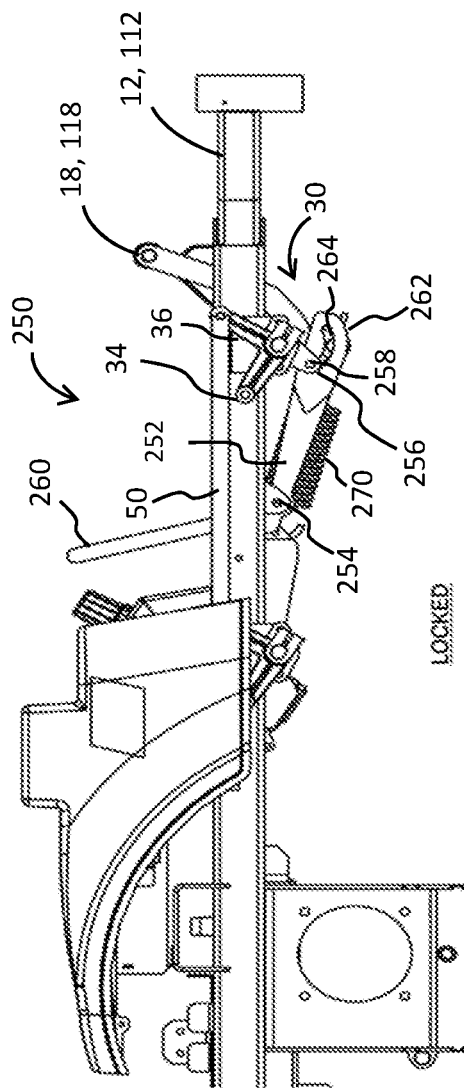
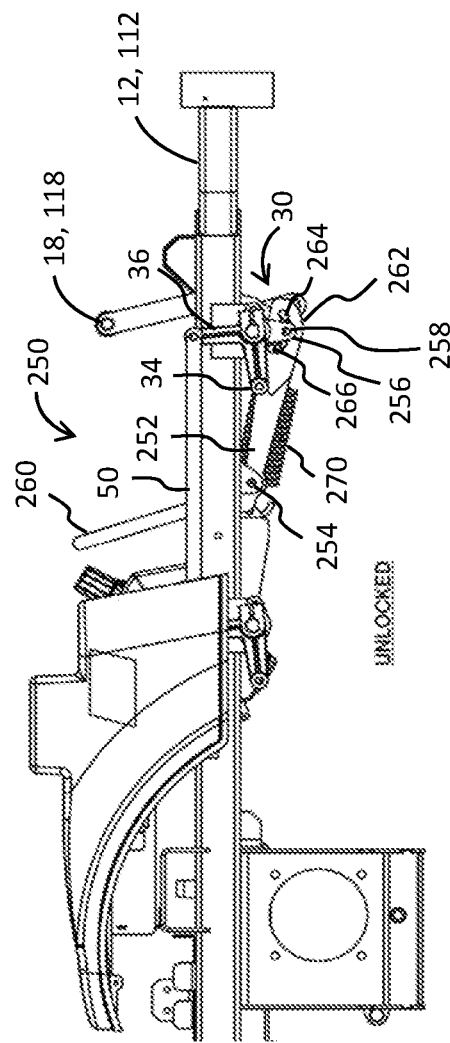

SECTION B-B

DETAIL E

MOWER WITH ROTARY CUT HEIGHT ADJUSTMENT

CROSS-REFERENCE TO RELATED APPLICATIONS

This application claims the benefit of U.S. Provisional Patent Application No. 62/458,939 filed Feb. 14, 2017, the disclosure of which is herein wholly incorporated by reference.

COPYRIGHT NOTICE

This application contains material that is subject to copyright protection. Such material may be reproduced exactly as it appears in Patent and Trademark Office patent files or records. The copyright owner otherwise reserves all rights to such material.

FIELD

The present disclosure relates to mowers for cutting grass and other vegetation. More particularly, the present disclosure relates to mowers having an adjustable cut height.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In the field of riding mowers, it is desirable to have a cutting deck that is adjustable to varying cut height positions. However, existing solutions have proven to be too cumbersome, complicated, or expensive. It would be a significant advancement in the art to provide a mower with a manual cut height adjustment system that is simple and easy to operate and inexpensive to manufacture and maintain.

SUMMARY

In some embodiments, a mower may include a frame, a cutting deck suspended from the frame, and a cut height adjustment system configured for raising and lowering the cutting deck to a plurality of cut height positions. The cut height adjustment system may include a stepped cylinder having a plurality of steps wherein each of the plurality of steps corresponds to one of the plurality of cut height positions, a pawl mounted to a pawl shaft and configured for rotatable engagement with and disengagement from each of the plurality of steps, a base plate fixed to a lower end of the stepped cylinder, a cylinder shaft extending upward from the base plate, a knob connected to the cylinder shaft, and a pedal mounted to a pedal shaft. The pedal shaft may be operably connected to the pawl shaft via one or more bell cranks and one or more push-pull rods such that rotation of the pedal shaft causes rotation of the pawl shaft. The pedal may be configured for forward movement in order to disengage the pawl from the stepped cylinder. The base plate may be rotatably mounted to the frame such that, when the pawl is disengaged from the stepped cylinder, one of the plurality of cut height positions is manually selectable by rotation of the knob. The cutting deck may be placed in the selected cut height position by allowing the pedal to move backward so as to engage the pawl with a corresponding step of the stepped cylinder.

In some embodiments, the base plate may include a plurality of holes or recesses respectively corresponding to the plurality of cut height positions, and the cut height adjustment system may further include a detent configured to cooperate with the plurality of holes or recesses in order to provide at least one of a tactile and an audible indication of each of the plurality of cut height positions.

In some embodiments, the mower may further include a lock configured for locking the pedal in order to hold the cutting deck in a raised transport position.

In some embodiments, a mower may include a frame, a cutting deck suspended from the frame, and a cut height adjustment system configured for raising and lowering the cutting deck to a plurality of cut height positions. The cut height adjustment system may include a stepped cylinder having a plurality of steps wherein each of the plurality of steps corresponds to one of the plurality of cut height positions, a pawl mounted to a pawl shaft and configured for rotatable engagement with and disengagement from each of the plurality of steps, a base plate fixed to a lower end of the stepped cylinder, a cylinder shaft extending upward from the base plate, a knob connected to the cylinder shaft, and an actuator operably connected to an actuator shaft. The actuator shaft may be operably connected to the pawl shaft via one or more bell cranks and one or more push-pull rods such that rotation of the actuator shaft causes rotation of the pawl shaft. The actuator may be configured for movement in order to disengage the pawl from the stepped cylinder. The base plate may be rotatably mounted to the frame such that, when the pawl is disengaged from the stepped cylinder, one of the plurality of cut height positions is manually selectable by rotation of the knob.

In some embodiments, a mower may include a frame, a cutting deck suspended from the frame, and a cut height adjustment system configured for raising and lowering the cutting deck to a plurality of cut height positions. The cut height adjustment system may include a stepped cylinder having a plurality of impressions and a plurality of steps, wherein each of said plurality of steps and each of said plurality of impressions corresponds to one of said plurality of cut height positions, a pawl mounted to a pawl shaft and configured for rotatable engagement with and disengagement from each of the plurality of steps, a knob connected to said stepped cylinder, and an arm including a tongue configured for pivotal engagement and disengagement with said plurality of impressions in order to provide at least one of a tactile and an audible indication of each of said plurality of cut height positions. The stepped cylinder may be rotatably mounted to said frame such that, when said pawl is disengaged from said stepped cylinder, one of said plurality of cut height positions is manually selectable by rotation of said knob.

Other features and advantages of the present disclosure will become apparent from the following detailed description, taken in conjunction with the accompanying drawings, which illustrate, by way of example, the principles of some exemplary and non-limiting embodiments of the invention.

BRIEF DESCRIPTION OF THE DRAWINGS

FIG. 2 is a perspective view of the rotary cut height adjustment system of the mower of FIG. 1 shown in a mowing position.

FIG. 3 is a detailed perspective view of Detail C indicated in FIG. 2.

FIG. 4 is a perspective view of the cut height adjustment system of the mower of FIG. 1 shown in a transport position.

FIG. 5 is a detailed perspective view of Detail D indicated in FIG. 4.

FIG. 6 is a top plan view of a stepped cylinder and associated mounting structure of the cut height adjustment system of the mower of FIG. 1.

FIG. 7 is a partial cross-sectional view taken in the direction of arrows A-A as indicated in FIG. 6.

FIG. 8 is an elevational view of a detent having a spring-loaded ball nose plunger.

FIG. 15 is a side elevational view of a lock handle assembly and nearby parts of a mower in a locked transport position.

FIG. 16 is a side elevational view of the lock handle assembly and nearby parts of the mower of FIG. 15 in an unlocked working or cutting position.

DETAILED DESCRIPTION

Figure 1:
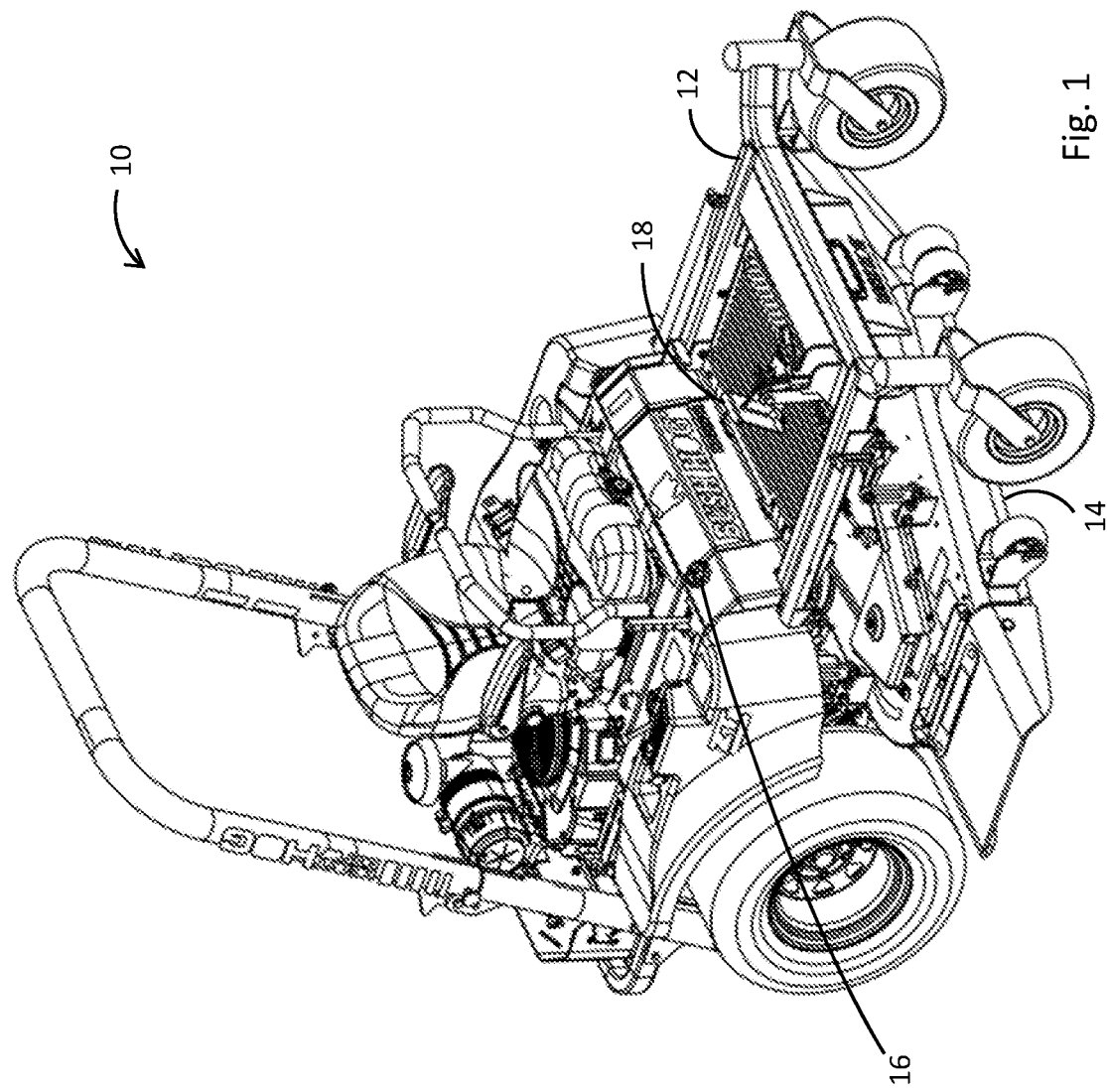
FIG. 1 is a perspective view of a first embodiment of a mower having a rotary cut height adjustment system.
Figure 9:
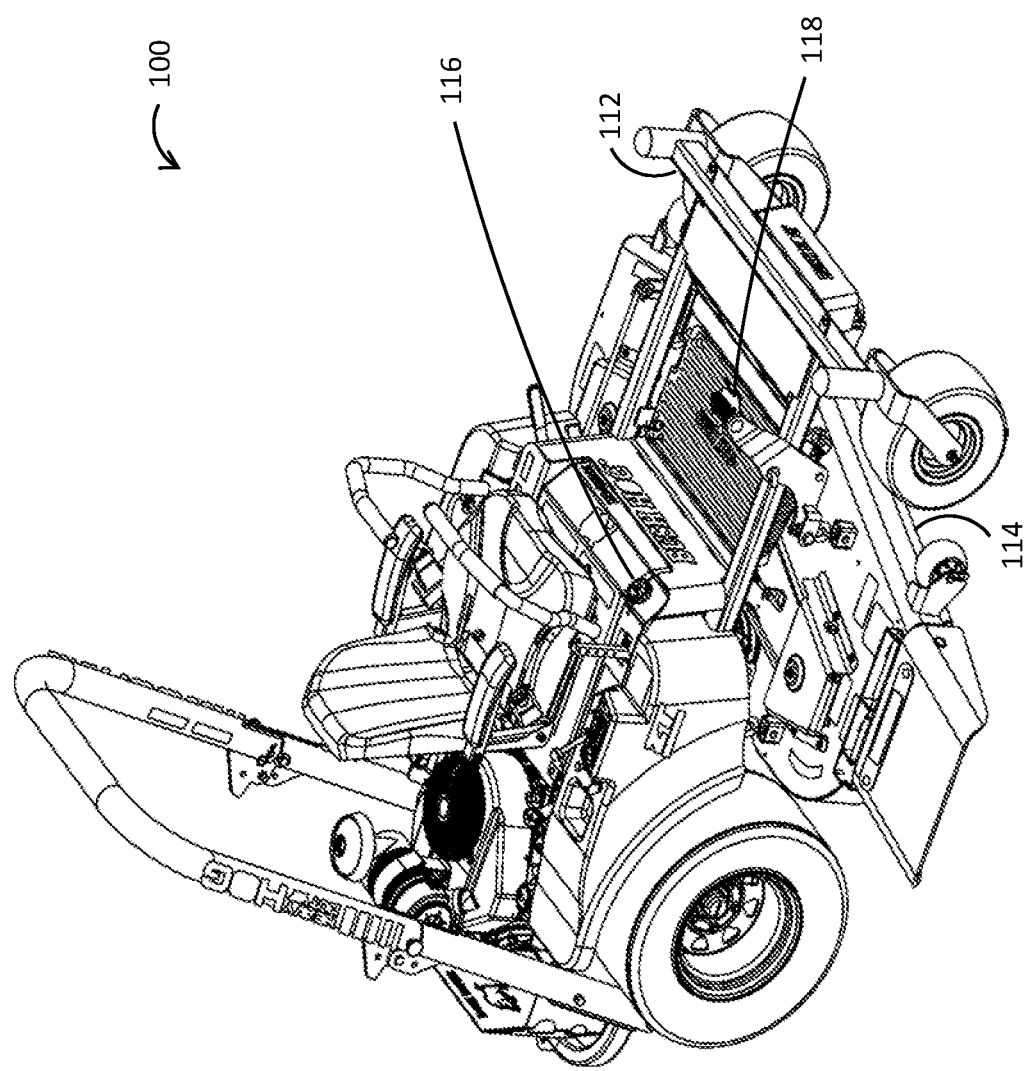
FIG. 9 is a perspective view of another embodiment of a mower having a rotary cut height adjustment system.
Figure 10:
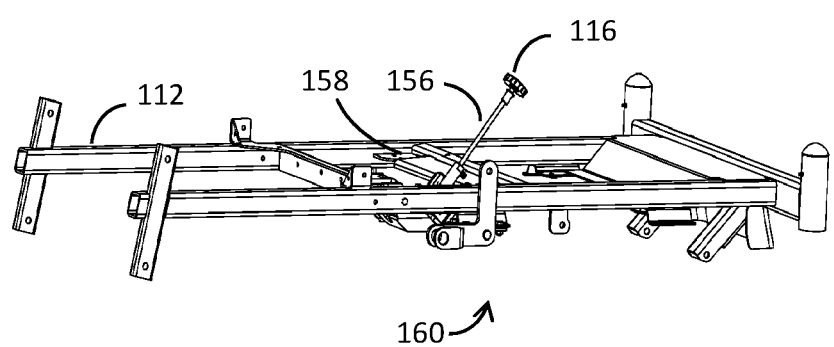
FIG. 10 is a perspective view of the frame of the mower of FIG. 9.
Figure 11:
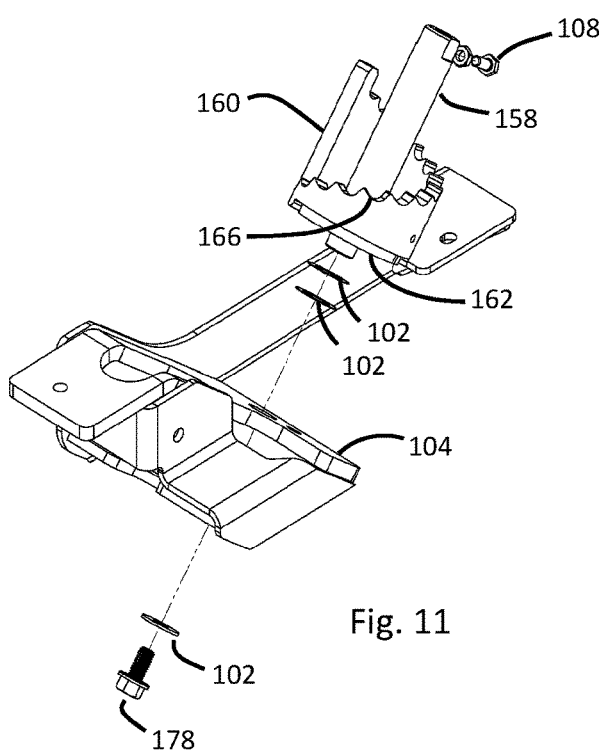
FIG. 11 is an exploded rear perspective view of a stepped cylinder and associated mounting structure of the cut height adjustment system of the mower of FIG. 9.
Figure 12:
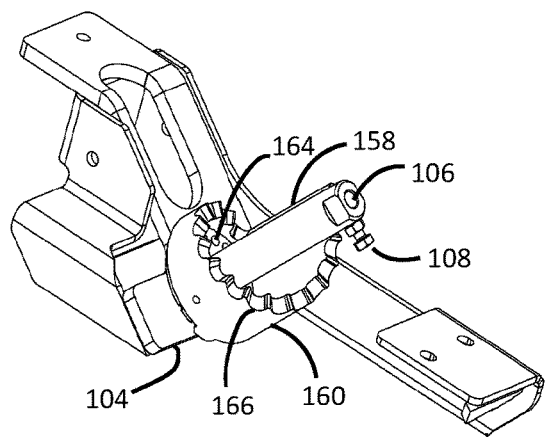
FIG. 12 is a front perspective view of the stepped cylinder and associated mounting structure of FIG. 11.

Referring to FIG. 1, a mower 10 may have a frame 12 and a cutting deck 14 suspended from frame 12 as described further below. The height of cutting deck 14 may be manually adjusted by rotating a knob 16, which may be part of a rotary cut height adjustment system described further below. A foot pedal 18 may be provided to raise and lower cutting deck 14 and lock cutting deck 14 in a raised transport position as described further below. In some embodiments, foot pedal 18 may be configured and operated as described in U.S. Pat. No. 6,588,188, the disclosure of which is incorporated herein by reference.

As shown in FIG. 2, mower 10 may have a rotary cut height adjustment system including a shaft 26 (sometimes referred to herein as a pedal shaft) and a shaft 52 (sometimes referred to herein as a pawl shaft), each of which may be rotatably mounted to frame 12. A pair of bell cranks 30 and 40 may be fixedly attached to shafts 26 and 52, respectively, and a push-pull rod 50 may be pinned to arms 36 and 46 of bell cranks 30 and 40 at pin connections 38 and 48, respectively. Thus, rotational motion imparted to shaft 26 via pedal 18 may be transferred to shaft 52. It should be understood that bell cranks 30 and 40 are shown for a right side of mower 10, and corresponding bell cranks (not shown) may be provided for a left side of mower 10. Cutting deck 14 may be suspended from mounting holes 34 and 44 of arms 32 and 42 of bell cranks 30 and 40, respectively, with chains, cables, rods, or other suitable suspension structures (not shown), and similar mountings may be provided for cutting deck 14 on the left side of mower 10. In such a configuration, pressing pedal 18 forward may cause cutting deck 14 to be raised, and allowing pedal 18 to move backward may cause cutting deck 14 to be lowered. A pawl 54 may be fixedly attached to shaft 52, and pawl 54 may have a tongue 70 (see FIG. 3) configured for engagement with a plurality of substantially flat steps 66 and/or walls 68 of a stepped cylinder 60. Stepped cylinder 60 may be fixedly mounted to a base plate 62, which may be rotationally mounted to frame 12 or other structure attached to frame 12. A shaft 58 may be fixedly mounted to base plate 62, and knob 16 may be attached to shaft 58 via another shaft 56. Of course, in some embodiments, knob 16 may be attached to base plate 62 with a single shaft, and knob 16 may be integral to such shaft. In some embodiments, cylinder 60, base plate 62, shafts 56 and 58, and knob 16 may have a common central axis of rotation. Such axis of rotation may be oriented substantially vertically or may be tilted from the vertical as shown. When tongue 70 of pawl 54 is engaged with stepped cylinder 60 and pedal 18 is not being pressed forward, the weight of cutting deck 14 reacted through pawl 54 serves to effectively keep stepped cylinder 60 in its current position. When tongue 70 of pawl 54 is lifted off of stepped cylinder 60 by pressing pedal 18 forward as shown, for example, in FIGS. 4 and 5, stepped cylinder 60 may be rotated to a desired position by rotating knob 16, and then cutting deck 14 may be set at the desired height by allowing pedal 18 to move backward until tongue 70 of pawl 54 comes into engagement with the selected step 66 as shown in FIGS. 2 and 3. Tongue 70 may also bear on the corresponding wall 68 above the selected step 66. Knob 16 may have a plurality of markings 72 corresponding to the various selectable height positions of cutting deck 14 defined by steps 66.

In some embodiments, pedal 18 may have a locking transport position as shown in FIG. 4 wherein one or more protrusions 20 depending from pedal 18 may be engaged with one or more recesses 24 formed in one or more plates 22 mounted to frame 12 or other structure attached to frame 12. The top portion of pedal 18 may be pivotally mounted at a pin connection 28 to help facilitate placing protrusions 20 into and out of engagement with recesses 24. Such a locking arrangement may be advantageous to hold cutting deck 14 in a raised transport position, for example. In some embodiments, the transport position may be the highest position of cutting deck 14. In some embodiments, a lock transport position as described above may operate in combination with a lock handle assembly 250 or 350, as described further in relation to FIGS. 15-18.

As shown in FIGS. 6-8, base plate 62 may be rotationally mounted to an underlying plate 74 and/or bracket 76 of frame 12 or depending from frame 12, for example, via a pin connector 78, and base plate 62 may have a plurality of holes 64 (or recesses on an underside of base plate 62) corresponding to the various selectable height positions of cutting deck 14 defined by steps 66 of stepped cylinder 60. A detent 80 may have a spring-loaded ball nose plunger 84 partially disposed within and partially protruding from a threaded shaft 82. Detent 80 may be threadably mounted to plate 74 and/or bracket 76 such that ball nose plunger 84 may be "clicked" into engagement with each of the plurality of holes 64 (or recesses) as the user rotates knob 16. In this manner, the user may receive tactile and audible feedback regarding the selected cut height position, in addition to the visual indication provided by markings 72 on knob 16. When no torque or insufficient torque is applied to knob 16, the engagement of ball nose plunger 84 with a hole 64 (or recess) of base plate 62 serves to hold stepped cylinder 60 in a selected position. The spring (not shown), size, and positioning of ball nose plunger 84 with respect to base plate 62 and the size and depth of holes 64 (or recesses) in base plate 62 may be selected so as to require a desired amount of torque to be applied to knob 16 in order to overcome the engagement of ball nose plunger 84 with base plate 62 and thereby rotate stepped cylinder 60 to a different position.

As shown in FIGS. 9-12, another embodiment of a mower 100 may have a frame 112 and a cutting deck 114 suspended from frame 112 as described above in connection with mower 10. Similar to mower 10, the height of cutting deck 114 may be manually adjusted by rotating a knob 116, which may be part of a rotary cut height adjustment system as described above in relation to mower 10. A foot pedal 118 may be provided to raise and lower cutting deck 114 as described above in relation to mower 10. In some embodiments, foot pedal 118 may or may not be configured to lock in a transport position as described in U.S. Pat. No. 6,588, 188. Similar to mower 10, mower 100 may have a stepped cylinder 160 mounted to a base plate 162, which may be rotationally mounted to a plate 104 or other structure of frame 112 via a fastener 178 and one or more washers 102 or other suitable rotational mount. In some embodiments, stepped cylinder 160 may have a plurality of arcuate steps 166 configured for engagement with a tongue of a pawl to set the cut height of cutting deck 114 similar to that described above for mower 10. A shaft 158 may be attached to base plate 162, shaft 158 may have a receptacle 106 configured for receiving a shaft 156, and knob 116 may be fastened to shaft 156. Shaft 156 may be secured to shaft 158 with a set screw 108 or other suitable attachment. Similar to mower 10, mower 100 may also have a detent (not shown) similar to detent 80 configured to cooperate with holes or recesses (not shown) formed in base plate 162 in order to provide tactile and audible indications of each selected cut height position. In some embodiments, an uppermost cut height position may serve as a transport position, wherein the tongue of the pawl is engaged with an uppermost arcuate step 166.

Figure 13:
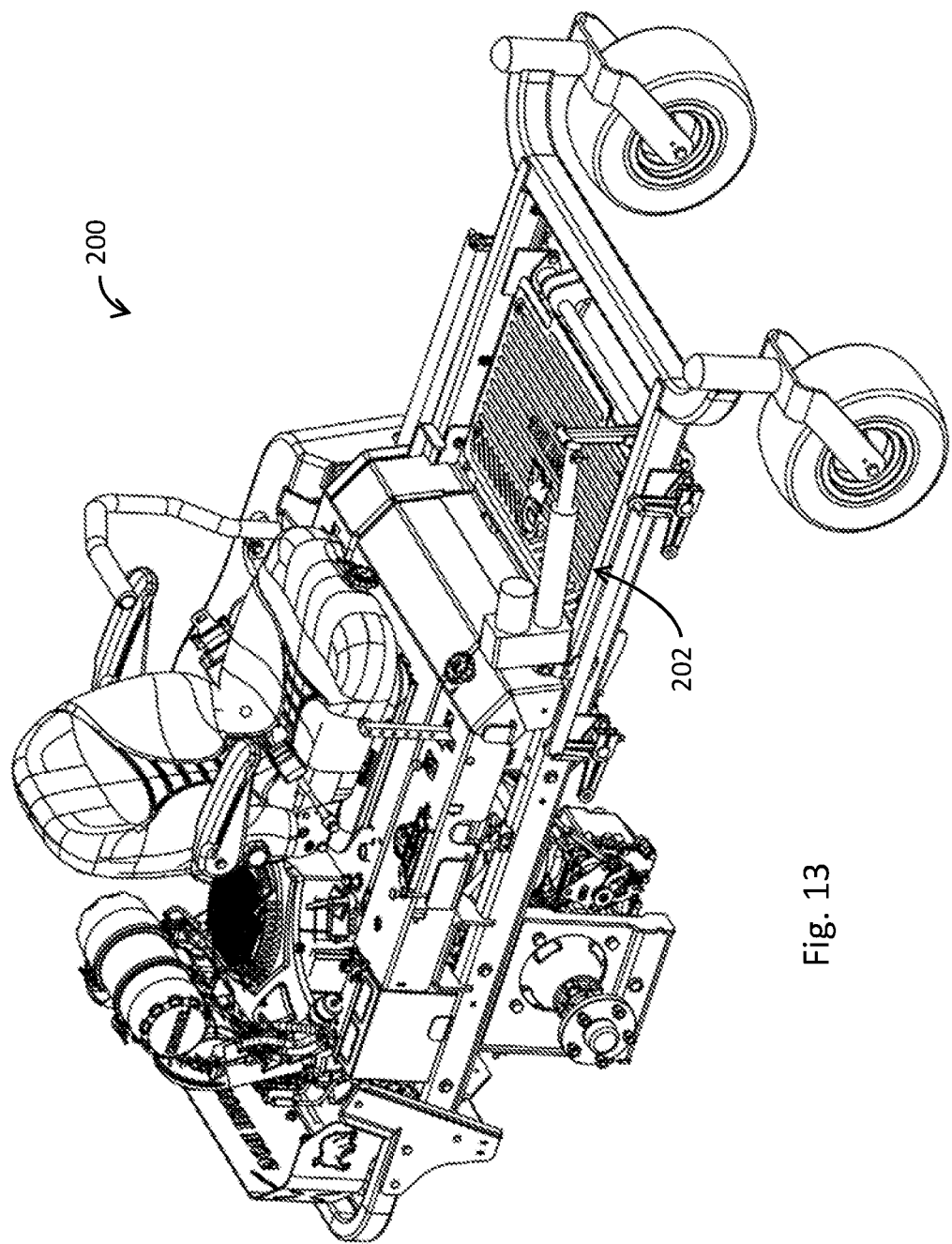
FIG. 13 is a perspective view of still another embodiment of a mower having a rotary cut height adjustment system.
Figure 14:
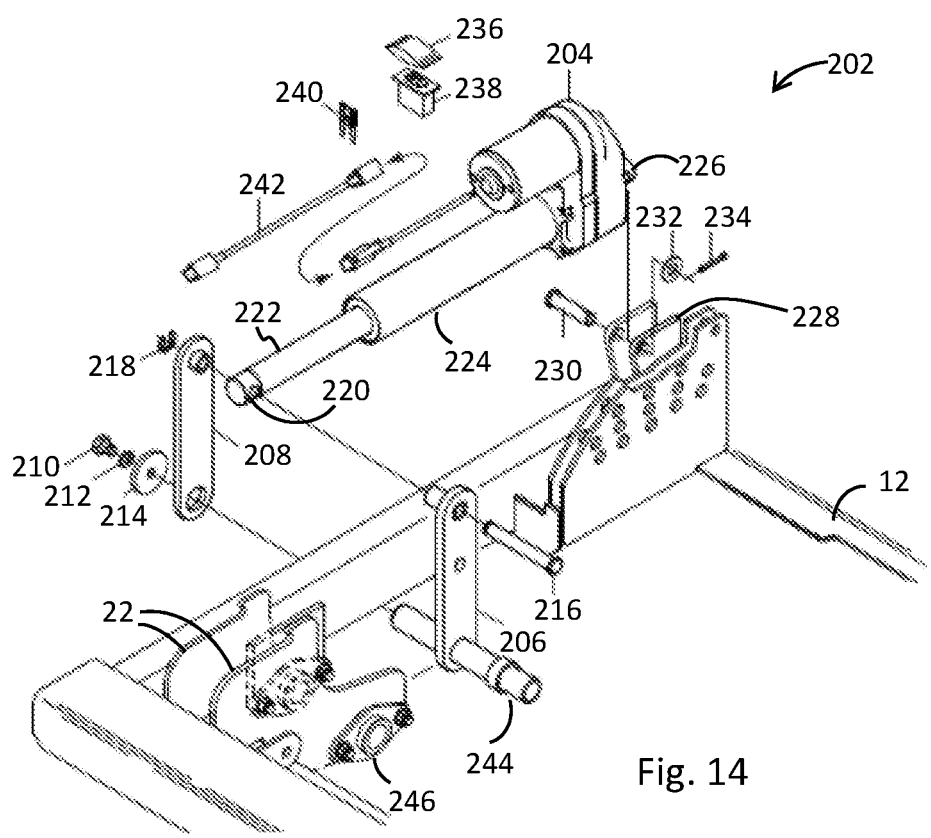
FIG. 14 is an exploded perspective view of an actuator of the rotary cut height adjustment system of the mower of FIG. 13.

Referring to FIG. 13, another embodiment of a mower 200 is shown. Mower 200 may be very similar to mower 10 or mower 100 described above, except that pedal 18 or 118, respectively, may be replaced by an actuator assembly 202 configured for raising and lowering the cutting deck 14 or 114, respectively. As shown in FIG. 14, actuator assembly 202 is illustrated as having an electric actuator 204, but the actuator may be a hydraulic, pneumatic, or other suitable type of actuator. As illustrated, actuator 204 may have a cylinder 224 and a rod 222 that is extendable from and retractable into cylinder 224. Actuator 204 may have a boss 226 at one end that may be pinned to a pair of flanges 228 or other suitable structure depending from frame 12 using a clevis pin 230, washer 232, and cotter pin 234, for example. An end of rod 222 may be pinned as shown at 220 to a pair of arms 206, 208 using a grooved clevis pin 216 and retaining ring 218, for example. Of course, other mounting arrangements may be used, if desired. Arm 206 may be fixed to a shaft 244 (sometimes referred to herein as an actuator shaft) via a weldment, for example, and arm 208 may be fixed to shaft 244 using a washer 214, lock washer 212, and cap screw 210 in cooperation with a threaded hole (not shown) in shaft 244, for example. Shaft 244 may be rotatably mounted to plates 22 as shown at 246, and shaft 244 may be fixed to rotatable shaft 26 described above (see, e.g., FIGS. 2 and 4). Alternatively, shaft 244 may replace shaft 26 (or arms 206 and 208 may be fixed to shaft 26, which may replace shaft 244 and may serve as an actuator shaft). In any event, with such a configuration, extension of rod 222 may cause cutting deck 14 or 114 to be raised, and retraction of rod 22 may cause cutting deck 14 or 114 to be lowered. As persons of ordinary skill in the art will appreciate, mower 200 may have a rotary cut height adjustment system having a stepped cylinder and knob for setting the cut height of cutting deck 14 or 114 similar to that described above in relation to mower 10 and mower 100, wherein the raising and lowering of cutting deck 14 or 114 in cooperation with the cut height adjustment system occurs via operation of actuator 204 rather than foot operation of pedal 18 or 118.

Still referring to FIG. 14, the operation of actuator 204 (and hence the raising and lowering of cutting deck 14 or 114) may be controlled by a switch 238, which may be connected to actuator 204 via an actuator lead 242. A fuse 240 may be provided to protect the electrical circuit of actuator 204. Switch 238 may have a switch cover 236 and may be mounted on a console that is manually accessible by the user. For example, a user may press an "Up" button to raise cutting deck 14 or 114, and a user may press a "Down" button to lower cutting deck 14 or 114. In some embodiments, the "Up" motion may be stopped at a transport position as described above, and the "Down" motion may be stopped at the cut height setting of the cut height adjustment system as described above. Of course, other control switches and configurations may be used, depending on the particular application. For example, persons of ordinary skill in the art will appreciate that actuator 204 and the associated mounting structure may be configured such that extension of rod 222 may cause cutting deck 14 or 114 to be lowered rather than raised, and retraction of rod 22 may cause cutting deck 14 or 114 to be raised rather than lowered.

As shown in FIG. 15 and FIG. 16, in some embodiments, a mower 10 or 100 may include a lock handle assembly 250. Lock handle assembly 250 may support cutting deck 14 or 114 in a locked transport position. In some embodiments, lock handle assembly 250 may work together with a pedal lock as previously described herein in order to support cutting deck 14 or 114 in a locked transport position. Lock handle assembly 250 may include a lever 252 pivotally attached to a frame 12 or 112. For example, lever 252 may be pivotally mounted to the frame 12 or 112 via mounting joint 254. In some embodiments, lever 252 may comprise an angled, curved, or generally L-shaped arm. Lever 252 may include a first end 260 accessible to an operator as a handle and a second end 262. In some embodiments, the first end 260 of lever 254 may be configured to enhance the handle's grip. For example, first end 260 may be coated or covered with a suitable material to enhance the handle's grip. For example, first end 260 may include a molded plastic grip. The second end 262 of lever 252 may include a slot 264 configured for sliding engagement with a pin 258. In some embodiments, the position of the pin 258 within slot 264 may be coupled to operation of pedal 18 or 118 and/or height adjustment of the cutting deck 14 or 114. For example, a sliding motion of the pin 258 within slot 264 may be provided through one or more of the bell cranks 30, 40, push-pull rod 50 or another part that may move when adjusting the position of cutting deck 14, 114. In some embodiments, pin 258 may be attached to a connector arm 256 which may be part of or attached to one or more of the bell cranks 30, 40 (such as bell crank 30 as shown in FIG. 15 and FIG. 16). Thus, operation of the pedal 18 or 118 and movement of the one or more of the bell cranks 30, 40 may initiate sliding movement of the pin 258 within the slot 264. In some embodiments, either or both of connector arm 256 and/or the second end 262 of lever 252 may comprise a clevis, and pin 258 may comprise a clevis pin.

In some embodiments, when an operator initiates movement of the cutting deck 14, 114 to a transport position, pin 258 may automatically engage a locking notch 266 included in slot 264. For example, as the pin 258 slides within the slot 264 to accommodate raising of the cutting deck 14, 114, the pin 258 may be automatically positioned within locking notch 266 as shown in FIG. 15. In such a configuration, movement of the pin 258 may be confined within the locking notch 266. Thus, the locking notch 266 may be advantageous to hold cutting deck 14, 114 in a raised transport position, for example. However, an operator may move the handle 260 to release pin 258 from locking notch 266 and thereby release cutting deck 14, 114 and allow it to drop into a working or cutting position. Referring to FIG. 16, when a mower is in a working or cutting position, pin 258 may readily slide within slot 264. For example, the pin 258 may slidably adjust within slot 264 depending upon a selected cutting level.

Still referring to FIG. 15 and FIG. 16, in some embodiments, a mower 10 or 100 including lock handle assembly 250 may include a spring 270. Spring 270 may include a first end (not shown) attached to frame 12 or 112 and a second end (not shown) attached to bell crank 30. Alternatively, other points of attachment may be used to orient spring 270 along a desired axis. For example, as shown in FIG. 15 and FIG. 16, the spring 270 may be oriented as appropriate to apply a tensile force to the bell crank 30, wherein the applied force may tend to rotate the bell crank 30 and bias pin 258 towards locking notch 266. Thus, the spring 270 may be useful to help direct the pin 258 into locking notch 266, for example. In some embodiments, spring 270 may apply a torque that tends to rotate bell crank 30 in an angular direction opposing a torque applied by the weight of cutting deck 14 or 114. Accordingly, an operator attempting to adjust a mower 10 or 100 to a transport position may have to apply less force than the operator otherwise would have to apply in the absence of spring 270.

Figure 17:
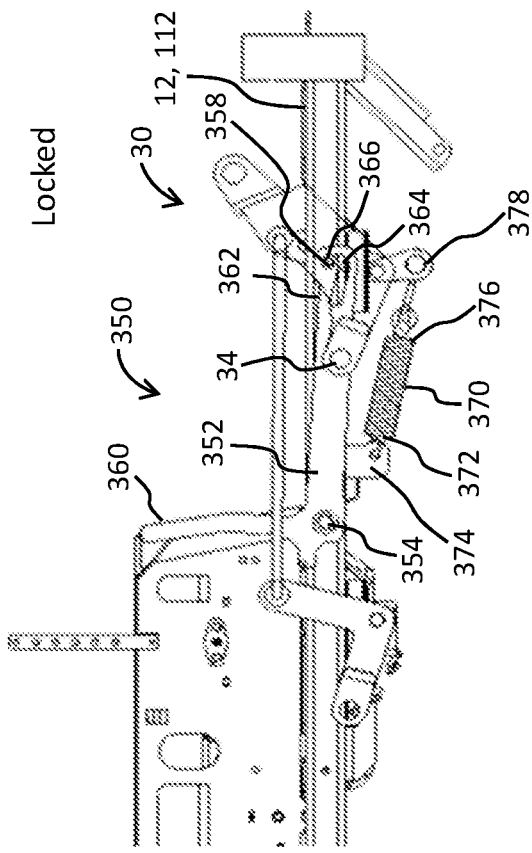
FIG. 17 is a side elevational view of another embodiment of a lock handle assembly and nearby parts of a mower in a locked transport position.
Figure 18:
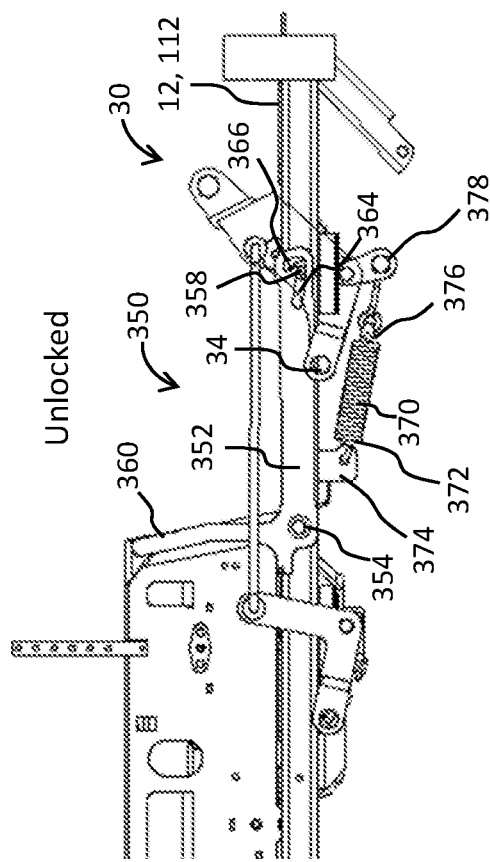
FIG. 18 is a side elevational view of the lock handle assembly and nearby parts of the mower of FIG. 17 in an unlocked working or cutting position.
Figure 19:
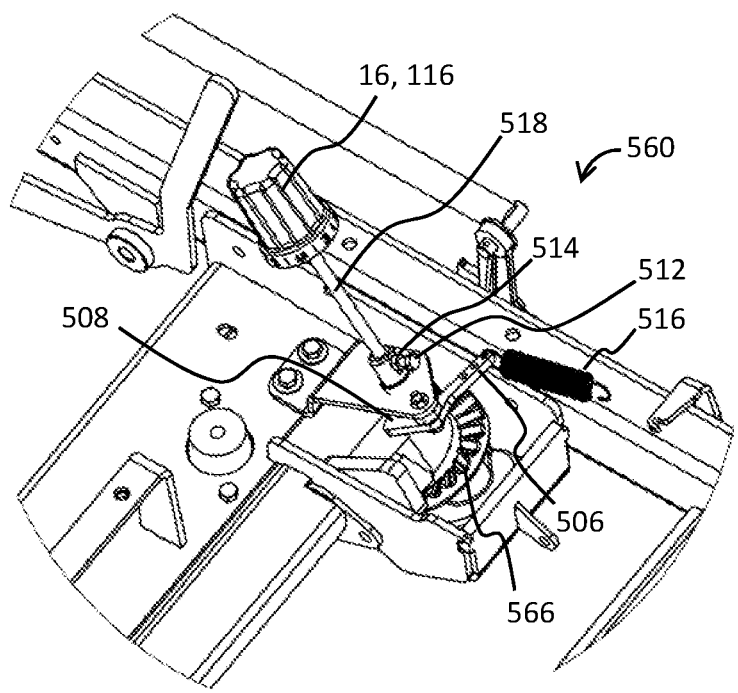
FIG. 19 is a perspective view of a rotary stepped cylinder and spring-loaded lever arm.

As shown in FIGS. 17 and 18, in some embodiments, a mower 10 or 100 may include lock handle assembly 350. Lock handle assembly 350 may support or help to support cutting deck 14 or 114 in a locked transport position. In some embodiments, lock handle assembly 350 may work together with a pedal lock as previously described herein in order to support cutting deck 14 or 114 in a locked transport position.

Similar to that described above in relation to lock handle assembly 250, the lock handle assembly 350 may include a lever 352 pivotally mounted to the frame 12 or 112. For example, lever 352 may be attached to the frame 12 or 112 via a mounting joint 354. Lever 352 may include a first end 360 accessible to an operator as a handle and a second end 362. In some embodiments, the first end 360 of lever 352 may be fashioned or shaped to enhance the handle's grip and/or coated or covered with a suitable material to enhance the handle's grip. For example, first end 360 may include a molded plastic grip. The second end 362 of lever 352 may include a slot 364 configured for sliding engagement with a pin 358. In some embodiments, the position of the pin 358 within slot 364 may be coupled to operation of pedal 18 or 118 and/or height adjustment of the cutting deck 14 or 114. For example, the pin 358 may be welded to the bell crank 30. Accordingly, a sliding motion of the pin 358 within slot 364 may be provided through the bell crank 30.

In some embodiments, when an operator initiates movement of the cutting deck 14 or 114 to a transport position, pin 358 may automatically engage a locking notch 366 included in slot 364. For example, as the pin 358 slides within the slot 364 to accommodate raising of the cutting deck 14 or 114, the pin 358 may be automatically positioned within locking notch 366 as shown in FIG. 17. In such a configuration, movement of the pin 358 may be confined within the locking notch 366. Thus, the locking notch 366 may be advantageous to hold cutting deck 14 or 114 in a raised transport position, for example. However, an operator may move the handle 360 to release pin 358 from locking notch 366 and thereby release cutting deck 14 or 114 and allow it to drop into a working or cutting position. Referring to FIG. 18, when a mower is in a working or cutting position, pin 358 may readily slide within slot 364. For example, the pin 358 may slidably adjust within slot 364 depending upon a selected cutting level.

In some embodiments, a mower 10 or 100 including lock handle assembly 350 may include a spring 370. Spring 370 may include a first end 372 attached to frame 12 or 112 via an arm 374 and a second end 376 attached to bell crank 30 via bell crank arm 378. As shown in FIG. 17, the spring 370 may be oriented as appropriate to apply a tensile force to bell crank arm 378 urging bell crank 30 to rotate. Rotation of the bell crank 30 may direct pin 358 through slot 364 and towards locking notch 366. Thus, the spring 370 may be useful to bias the pin 358 into locking notch 366, for example. In some embodiments, spring 370 may apply a torque that tends to rotate bell crank 30 in an angular direction opposing a torque applied by the weight of cutting deck 14 or 114. Accordingly, an operator attempting to adjust a mower 10 or 100 to a transport position may have to apply less force than the operator otherwise would have to apply in the absence of spring 370.

As shown in FIGS. 19-24, in some embodiments, a mower 10, 100, or 200 may include a stepped cylinder 560. Stepped cylinder 560 may be rotationally mounted to an underlying plate and/or bracket 574 of frame 12 or 112 or depending from frame 12 or 112. For example, stepped cylinder 560 may be rotatably mounted to frame 12 or 112 using a ball bearing 502 and a retaining ring 504, as most clearly shown in FIGS. 20, 21, and 24. Stepped cylinder 560 may further be attached to a knob 16 or 116 via a shaft 518 so that rotation of knob 16 or 116 may also rotate the stepped cylinder 560. In some embodiments, stepped cylinder 560 may have a plurality of arcuate steps 566 configured for engagement with a tongue of a pawl to set the cut height of a cutting deck 14 or 114 similar to that described for mower 10, 100, 200.

In some embodiments, stepped cylinder 560 may also include impressions 500. For example, stepped cylinder 560 may comprise a cast piece with impressions 500 integrally formed therein. Alternatively, impressions 500 may be part of a separately machined piece, which may be attached to stepped cylinder 560 via a threaded connection or attached in some other suitable way. As described above, the stepped cylinder 560 may include various steps 566, wherein each of the plurality of steps 566 corresponds to one of a plurality of cut height positions. Impressions 500 may be configured to correspond with various selectable cut height positions of cutting deck 14 defined by steps 566.

In some embodiments, an arm 506 may be rotatably or pivotably mounted to frame 12 or 112. For example, arm 506 may comprise a spring-loaded lever arm. In some embodiments, arm 506 may further be attached to a spring 516, another end of which may be attached to another part of frame 12 or 112. Arm 506 may include a tongue 508 configured for engagement with the impressions 500 of the stepped cylinder 560. For example, arm 506 may be biased using spring 516 in order to urge tongue 508 to a position suitable for engaging an impression among the impressions 500. As a user rotates knob 16, 116, force may be applied to overcome a biasing force applied by the spring 516, and the tongue 508 may be "clicked" into engagement with another impression 500 corresponding to another cut height position. Accordingly, a user may receive tactile feedback, audible feedback, or a combination of both regarding the selected cut height position. When no torque or insufficient torque is applied to knob 16, 116, the engagement of tongue 508 with an impression 500 of stepped cylinder 560 serves to hold stepped cylinder 560 in a selected position. The stiffness of the spring 516 and positioning of lever arm 506 with respect to the stepped cylinder 560 and the size, shape, and depth of impressions 500 may be selected so as to require a desired amount of torque to be applied to knob 16, 116 in order to overcome the engagement of lever arm 506 with impressions 500 and thereby rotate stepped cylinder 560 to a different position to adjust the cut height of cutting deck 14, 114.

Figure 20:
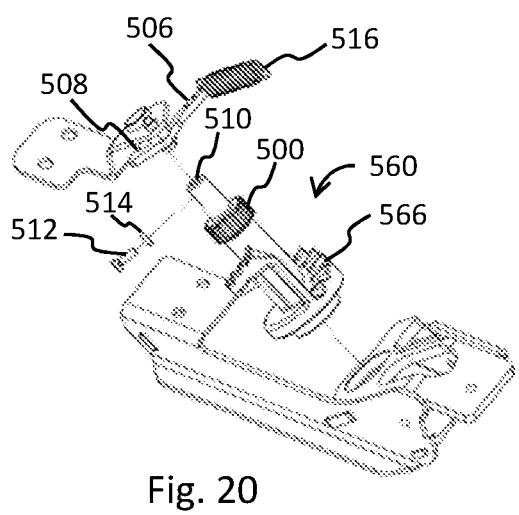
FIG. 20 is an exploded perspective view of a mounting configuration for the rotary stepped cylinder and spring-loaded lever arm of FIG. 19.
Figure 21:
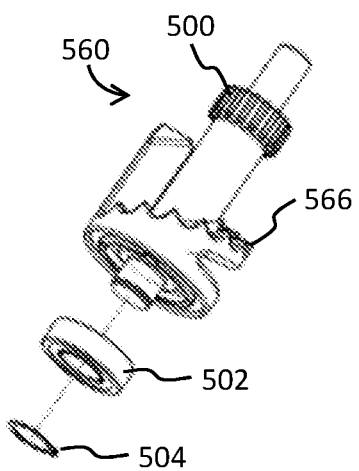
FIG. 21 is an exploded perspective view of a mounting configuration for the rotary stepped cylinder shown in FIGS. 19 and 20.
Figure 22:
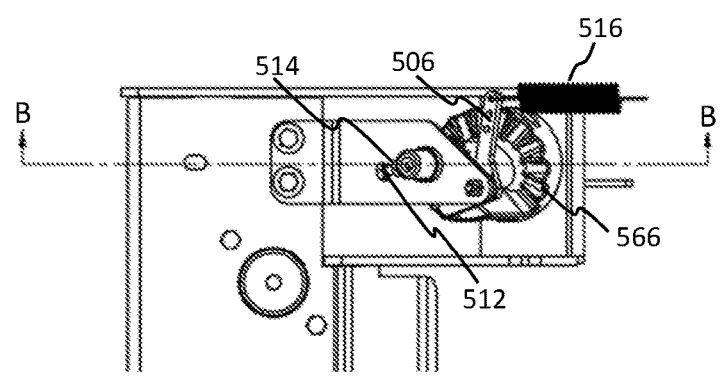
FIG. 22 is a top plan view of the rotary stepped cylinder and spring-loaded lever arm of FIGS. 19-21 and associated mounting structure.
Figure 23:
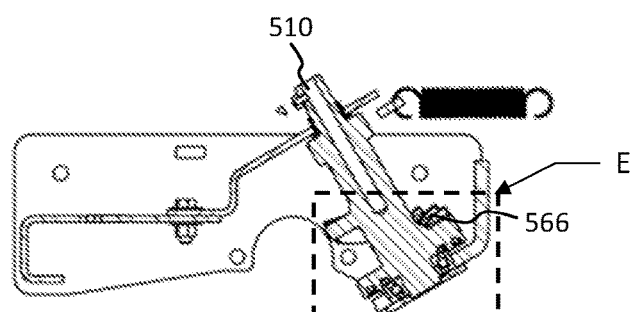
FIG. 23 is a cross-sectional view of the rotary stepped cylinder and spring-loaded lever arm of FIGS. 19-22 taken in the direction of arrow B-B as indicated in FIG. 22.
Figure 24:
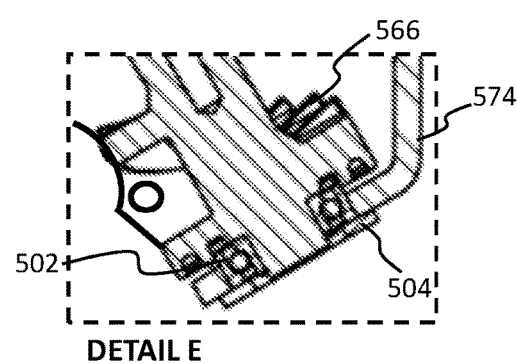
FIG. 24 is a cross-sectional view of Detail E in FIG. 23.

In some embodiments, as shown in FIG. 20, stepped cylinder 560 may be a cast or machined part that includes a receptacle 510 suitable for receiving shaft 518. Shaft 518 may be secured to stepped cylinder 560 with a set screw 512 and retaining ring 514 or other suitable attachment. In other embodiments, shaft 518 may be integrally formed as part of stepped cylinder 560. As shown in FIGS. 21-24, stepped cylinder 560 may be mounted to bracket 574 of frame 12 using ball bearing 502 and retaining ring 504, for example.

The embodiments described herein are some examples of the current invention. Various modifications and changes of the current invention will be apparent to persons of ordinary skill in the art. Among other things, any feature described for one embodiment may be used in any other embodiment. Also, it should be understood that when a component is described herein as being mounted to frame 12 or 112, such mounting may be direct with no intermediate components or indirect with one or more intermediate components. Although the description herein is primarily in reference to zero turn mowers, it should be understood that some embodiments of the invention may involve other types of mowers. The scope of the invention is defined by the attached claims and other claims that may be drawn to this invention, considering the doctrine of equivalents, and is not limited to the specific examples described herein.

What is claimed is:

1. A mower comprising:
    a frame;
    a cutting deck suspended from said frame; and
    a cut height adjustment system configured for raising and lowering said cutting deck to a plurality of cut height positions, said cut height adjustment system comprising
        a stepped cylinder having a plurality of steps wherein each of said plurality of steps corresponds to one of said plurality of cut height positions,
        a pawl mounted to a pawl shaft and configured for rotatable engagement with and disengagement from each of said plurality of steps,
        a base plate fixed to a lower end of said stepped cylinder,
        a cylinder shaft extending upward from said base plate,
        a knob connected to said cylinder shaft, and
        a pedal mounted to a pedal shaft;
    wherein said pedal shaft is operably connected to said pawl shaft via one or more bell cranks and one or more push-pull rods such that rotation of said pedal shaft causes rotation of said pawl shaft;
    wherein said pedal is configured for forward movement in order to disengage said pawl from said stepped cylinder; and
    wherein said base plate is rotatably mounted to said frame such that, when said pawl is disengaged from said stepped cylinder, one of said plurality of cut height positions is manually selectable by rotation of said knob.

2. The mower of claim 1 wherein said base plate comprises a plurality of holes or recesses respectively corresponding to said plurality of cut height positions, and wherein said cut height adjustment system further comprises a detent configured to cooperate with said plurality of holes or recesses in order to provide at least one of a tactile and an audible indication of each of said plurality of cut height positions.

3. The mower of claim 2 wherein said detent includes a spring-loaded ball nose plunger.

4. The mower of claim 1 further comprising a lock configured for locking said pedal in order to hold said cutting deck in a transport position.

5. The mower of claim 1 further comprising:
    a lock handle assembly including a lever pivotally mounted to said frame;
    wherein said lever includes a first end accessible to an operator and a second end including a slot; and
    a pin in sliding engagement with said slot;
    wherein said slot includes a locking notch configured for holding said pin in a locked position; and
    wherein said lock handle assembly is manually adjustable to release said pin from said locking notch in order to position said cutting deck in a cutting position.

6. The mower of claim 5 wherein said pin is in sliding engagement with said slot for all of said plurality of cut height positions.

7. The mower of claim 1 further comprising a lock handle assembly including a lever, said lever including a first end with a handle and a second end including a slot slidably engaged with a pin; and
    wherein said slot includes a locking notch configured for holding said pin in order to support said cutting deck in a transport position.

8. The mower of claim 7 wherein said mower is configured such that said pin automatically engages said locking notch when said pedal is depressed in order to raise said cutting deck to said transport position.

9. The mower of claim 1 wherein each of said plurality of steps are faced in a direction about parallel to an axis of rotation of said stepped cylinder.

10. The mower of claim 1 wherein each of said stepped cylinder and said base plate have a common central axis of rotation, each of said plurality of steps spaced apart from said base plate along a direction of said central axis of rotation.

11. The mower of claim 1 wherein said pawl comprises a tongue shaped to engage one or more of said steps so that a weight of said cutting deck is reacted through said pawl to keep said stepped cylinder in a selected position.

* * * * *

UNITED STATES PATENT AND TRADEMARK OFFICE
CERTIFICATE OF CORRECTION

PATENT NO. : 11,006,574 B1  
APPLICATION NO. : 15/896825  
DATED : May 18, 2021  
INVENTOR(S) : Jonathan Nichols et al.

Page 1 of 1

It is certified that error appears in the above-identified patent and that said Letters Patent is hereby corrected as shown below:

In the Claims

Column 5, Line 56, -recesses (not shown)- should be changed to --recesses 164--.

Column 6, Line 25, -rod 22- should be changed to --rod 222--.

Column 6, Line 53, -rod 22- should be changed to --rod 222--.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*